Patented Jan. 30, 1945

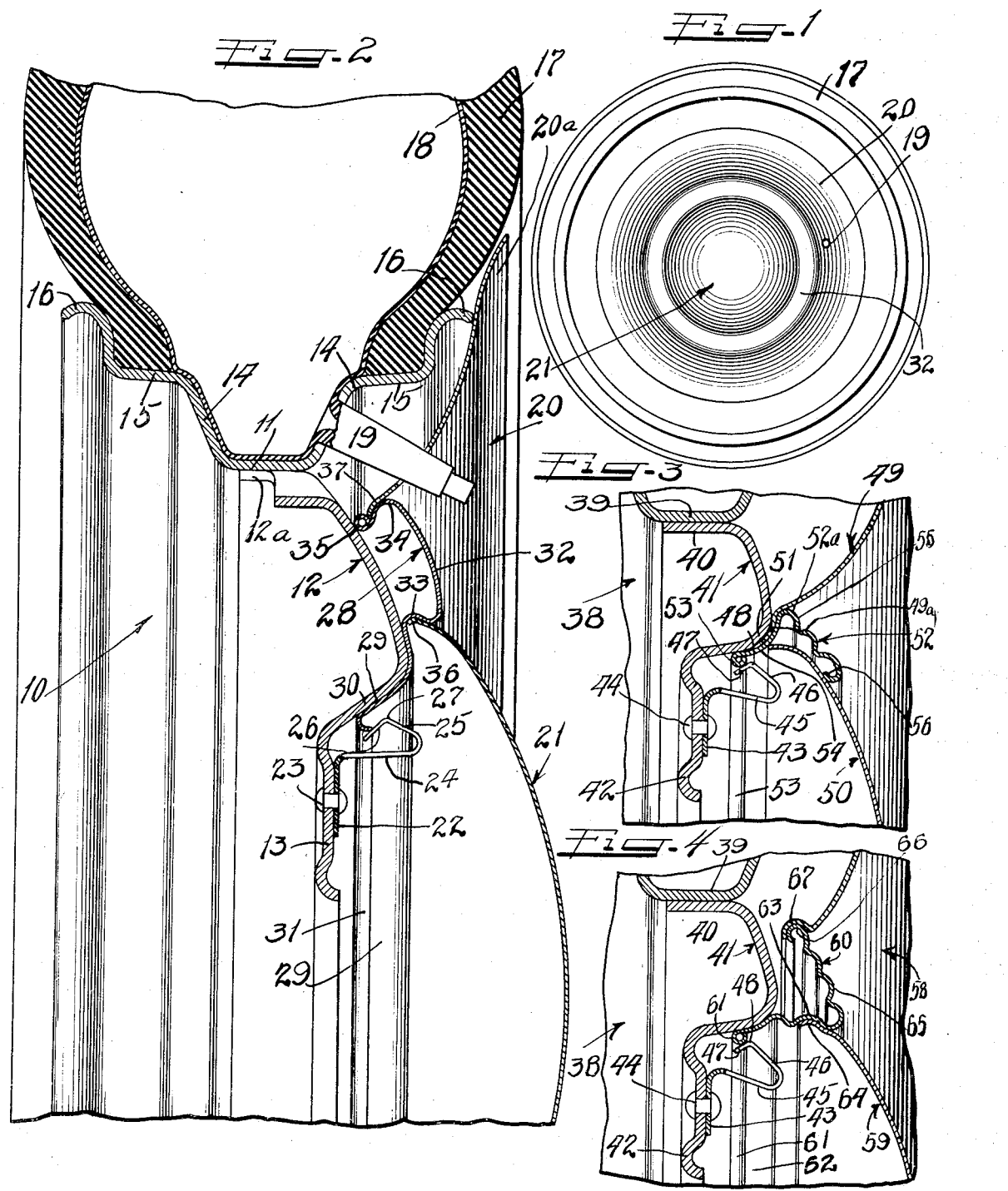

2,368,250

UNITED STATES PATENT OFFICE 2,368,250

WHEEL STRUCTURE

George Albert Lyon, Allenhurst, N. J.

Application July 22, 1943, Serial No. 495,679

18 Claims. (Cl. 301—37)

This invention is directed to an improved wheel structure and more particularly to an improved cover assembly therefor.

One of the important objects of the invention is to provide an improved retaining arrangement for maintaining a multi-part cover assembly over the outer side of a wheel structure.

Still another object of the invention is to provide an improved retaining assembly for securing to a wheel structure a multi-part cover assembly in which the cover is preferably formed from a synthetic plastic material and has physical properties which enable it to be self-sustaining and form-retaining and yet resiliently, temporarily, locally flexible to render the rear side thereof accessible, the cover returning to its initial position after the deforming pressures have been released therefrom.

Still another object of the invention is to provide for a wheel structure a cover assembly which substantially conceals the entire outer side of the wheel structure and yet which may be efficiently, detachably retained thereon by retaining engagement of the radially inner parts thereof.

It is still a further object of the invention to provide for a wheel structure having a multi-part cover assembly, improved retaining means which may be maintained upon the wheel structure by virtue of engagement thereof with substantially the radially inner portion of the wheel, the retaining means extending radially outwardly and serving also as a further ornamental device for the wheel.

In accordance with the general features of my invention as embodied in one form thereof, there is provided herein a wheel structure having a tire rim of the drop center type and a central load bearing portion secured thereto so as to form a unitary structure, the central load bearing portion including an axially inwardly offset bolt-on flange having resilient gooseneck spring clips attached thereto, there being an annular retaining member having the radially inner edge thereof resiliently snapped over the spring clip members for detachable engagement therewith, this retaining member having a radially outwardly disposed annular portion comprising an axially outwardly convex ornamental part provided at the radially inner and outer margins thereof with circular cover receiving recesses or undercut shoulders, the outer of said recesses being arranged to receive the radially inner margin of an outer annular cover member disposed over the outer side of the tire rim and the inner of said recesses being arranged to receive the radially outer margin of a central circular hub cap simulating cover member.

In accordance with the general features of my invention as shown in another form thereof, there is provided herein a wheel structure having a tire rim of the drop center type and a central load bearing portion provided with an axially inwardly disposed central bolt-on flange, this flange having a plurality of resilient gooseneck type spring clips secured thereon for resiliently receiving, in snap-on pry-off engagement, the axially inner part of a retaining annulus which is shaped so as to conform in part to the configuration of the adjacent portion of the outer surface of the wheel structure and so as to receive, in the part so configurated, the radially inner margin of an outer annular cover member, the remainder of the retaining member being formed to be axially exposed to comprise a trim member and to receive the radially outer margin of a central hub cap simulating cover member.

Other objects and advantages of the invention will be apparent from the following description and accompanying drawing in which:

Figure 1 is a side elevational view of a wheel structure embodying my invention;

Figure 2 is a fragmentary radial cross-sectional view of a wheel structure embodying the form of my invention shown in elevation in Figure 1;

Figure 3 is a fragmentary radial cross-sectional view of a wheel structure embodying a modified form of my invention; and Figure 4 is a fragmentary radial cross-sectional view of a wheel structure embodying a still further modified form of my invention.

It will be understood that the embodiments shown herein are for illustrative purposes only and may be changed or modified without departing from the spirit and scope of the invention as set forth in the appended claims.

As best shown in Figure 2, the wheel structure shown associated with the cover assembly of my invention includes a drop center type tire rim 10 having a base flange 11 to which is secured an axially inwardly extending marginal flange 12a of a central load bearing portion 12 as by riveting or welding or the like. The central load bearing portion 12 is further provided with a radially inwardly extending bolt-on flange 13.

The tire rim 10 is further provided with opposite side wall flanges 14, opposite intermediate flanges 15 and opposite edge portions 16 between which are adapted to be disposed the radially inner parts of a tire 17 having an inner tube 18 and a valve stem 19 which extends through a suitable aperture in one of the opposite side walls 14.

The cover member shown herein includes an outer annular portion 20 and a central hub cap simulating portion 21. Preferably the members 20 and 21 are formed from a synthetic plastic sheet material giving them physical properties to enable them to be self-supporting and form-retaining and yet enabling them to be flexed resiliently locally without permanent distortion thereof.

Furthermore, the trim member 20 is provided with a cross-sectional configuration of such expanse and shape that it entirely conceals the junction between the tire rim and the tire and furthermore is provided with a curvature of such shape that it substantially simulates the side wall of the tire 17 thereby to appear as a part thereof and further to give the appearance of being a massive tire mounted upon a wheel structure of minimum dimensions and to further give the appearance of being the white side wall of a massive tire when colored white.

A distinct advantage of making the central hub cap simulating cover member 21 of such material that it has the foregoing characteristics is that this portion of the cover may then accidentally abut obstructions such as curbing and the like, whereupon it will yield resiliently and will again assume its normal configuruation as shown, after the distorting pressure has been released.

To the end that the cover assembly described above may be securely retained upon the wheel structure in snap-on pry-off relationship, there is provided on the outer side of the bolt-on flange 13 an annulus 22 which may be riveted thereto as at 23. The annulus 22 is provided at the radially outer edge thereof with axially outwardly extending resilient finger-like members 24 which terminate in substantially axially inwardly bent portions 25 terminating in radially inwardly, axially inwardly, obliquely disposed portions 26. Thus there is provided between the portions 25 and 26 a radially outwardly extending protruding portion or peak 27, the purpose of which will be set forth presently. It will be understood that the above described spring clips are preferably circumferentially spaced around the annular member 22.

The retaining means for the cover assembly including the parts 20 and 21 is completed by the provision of an annular retaining member 28. This retaining member 28 is provided at the radially inner part thereof with an obliquely disposed flange 29 adapted to lie in surface engagement with the flange 30 of the body part of the wheel structure. The flange 29 terminates in a rolled or beaded edge portion 31 which is arranged to be urged axially inwardly with respect to the spring clips, thereby to flex the portions 25 and 26 and thus the peak 27 thereof radially inwardly until the bead has passed the peak 27, whereupon the clips spring resiliently outwardly into the position shown in Figure 2 to securely maintain the flange 29 and its appurtenances upon the wheel structure in snap-on pry-off engagement. The flange 29 is configurated at the radially outer part thereof to conform to the adjacent portion of the outer surface of the central load bearing portion 12 of the wheel, the radially outer part thereof being formed as at 32 to provide a bead which, when the retaining member 28 is constructed from stainless steel or the like may be highly polished to give a highly lustrous finish. The junction between the radially inner part of the retaining member 28 and the curvate portion 32 thereof is configurated to provide a radially outwardly facing groove or undercut shoulder 33 while the radially outer margin of the curvate portion is configurated to provide a circular hump 34 terminating in a circular bead 35. The bead 35 is arranged to bear against the adjacent portion at the outer surface of the central load bearing portion 12 of the wheel when the bead 31 has been snapped over the spring clips on the bolt-on flange 13.

Preferably the cover members 20 and 21 are assembled with the retaining member 28 before the assembly is secured to the wheel structure, whereby these parts constitute a unitary, easily handled structure.

In assembling the cover member 21 upon the retaining annulus 28 it will be seen that the radially outer edge portion thereof which is preferably slightly curled as at 36, is snapped into the circular, radially outwardly disposed groove 33.

In the application of the cover member 20 to the metallic retaining member 28, however, it will be seen that it is merely necessary to urge the radially inner edge 37 thereof from behind the retaining member and thus over the bead 35 into a position wherein this radially inner edge of the cover member 20 is disposed in nested relationship between the bead 35 and the rib 34.

It will be understood of course that the retaining member 28 may be associated with merely one of the cover members 20 or 21, however, it is preferable that both be used since the cover 21 conceals the spring clips described above and the cover member 20 conceals the irregular surface presented by the outer side of the flanged tire rim 10.

After the parts have been assembled as above described it will be seen that it is merely necessary to urge the bead 31 of the retaining member 28 axially inwardly until it has passed axially inwardly beyond the peaks 27 of the spring clips, whereupon the clips spring resiliently outwardly to maintain the desired snap-on pry-off engagement.

In order that the assembly above described may be easily removed from the wheel structure, it is merely necessary to insert the point of a suitable pry-off tool behind the circular bead or rib 34 of the retaining member 28 and thus beneath the radially inner extremity of the cover member 20 whereupon abutment of an intermediate portion of the tool against the adjacent edge portion 16 and axial inward movement of the outer end thereof will result in the entire, metallic retaining member 28 being urged axially outwardly to release the bead 31 thereof from the spring clips.

As will be seen from Figure 2, the radially outer extremity 20a of the cover member 20 is preferably of such radial expanse that it extends beyond the edge portion 16 of the tire rim to conceal the junction between the tire 17 and the tire rim. A still further advantage of the foregoing cover assembly is that during the pry-off operation the cover assembly has been found to suddenly snap away from the wheel structure and in some cases it falls to the ground and since the radially outer cover portion 20 is resilient and flexible, it will bear the force of the engagement with a pavement or the like, thereby to protect the remaining portion of the cover assembly against distortion or breakage.

With a construction such as that described above, it will be seen that the cover assembly may be constructed principally from a synthetic plastic material and yet, by virtue of the small proportion of metallic parts thereof, an extremely secure engagement and rigidified construction is obtained. As a result of this it is found that there is a considerable reduction of the unsprung weight involved, this greatly enhancing the operation of the vehicle. It has been found that a cover assembly, such as that described above, comprises approximately one-third of the total weight of such an assembly when constructed entirely from metal.

In the construction shown in Figure 3, the tire rim 38 is provided with a base flange 39 to which is secured as by riveting or welding or the like, a flange 40 of a central load bearing portion 41, having a radially inner bolt-on flange 42. An annulus 43 is secured to the outer surface of the bolt-on flange as by rivets 44, the annulus 43 terminating in its radially outer edge in resilient arms 45 provided at their outer ends with integral bolted back portions 46 terminating in radially inwardly, axially inwardly extending, obliquely disposed terminal portions 47. Thus it will be seen that a peak 48 is provided between the portions 46 and 47.

The multi-part cover assembly includes an outer annular portion 49 and an inner hub cap simulating circular portion 50, the portion 49 being provided with a radially inner marginal part configurated to conform to the shape of the curved portion 51 of the central load bearing wheel part 41. The radially inner marginal portion 49a of the annular cover member 49 is held against the adjacent portion of the outer surface of the body part 41 by means of an annular retaining member 52 having a cross-sectional configuration presenting an axially inner bead 53, an intermediate arcuate portion 54 arranged to conform to the configuration of a curvate portion 51 of the central load bearing part 41 of the wheel and an axially outer body portion 55 having an outer edge 56 thereof curled thereunder to provide a neat finished appearance. The body portion 55 is preferably concentrically corrugated as shown to rigidify the same and to enhance the appearance thereof. The retaining member 52 is likewise preferably constructed from a metal such as stainless steel or the like, so that when highly polished, it presents a lustrous external finish.

The central hub cap simulating cover member 50 is provided with a diameter greater than that of the circle prescribed by the edge 56 of the retaining member 52 and has the radially outer edge thereof formed into a substantially axially extending flange 57.

With the retaining member 52 so constructed, it will be seen that the inner edge of the cover member 49 is held securely in surface engagement with the central load bearing portion 41 of the wheel structure when the bead 53 is forced axially inwardly over the peaks 45 of the respective spring clips. The cover member 50 is secured to the retaining member 52 by engagement of the peripheral edge thereof with the inner surface of the retaining member, the edge 56 of the retaining member serving as a bearing support for the intermediate adjacent portion of the cover member. In order to remove the construction of Figure 3 from the wheel it is merely necessary to insert the point of a pry-off tool axially inwardly of the circular bead or rib 52a forming the radially outer extremity thereof, whereupon outward movement of the point will carry the retaining member with it to remove the bead 53 thereof from the spring clips. This removal operation of course carries with it the central hub cap member 50 and permits the annular cover 49 to fall away from the wheel.

Another aspect of the arrangement of Figure 3 is that the radially inner margin of the cover member 49 serves as a cushion between the metallic retaining member 52 and the metallic body portion 41, thus to eliminate excessive vibration and rattling during use.

In the construction shown in Figure 4, the wheel structure and clip arrangement is similar to that disclosed in Figure 3 and therefore like parts have been similarly designated in the latter figure.

The cover construction shown in Figure 4 includes an outer annular cover portion 58 and a central circular hub cap simulating portion 59, both of which are preferably constructed from a synthetic sheet material having the physical characteristics described above in conjunction with the cover constructions of Figures 2 and 3. The retaining member 60 shown in Figure 4, is provided at the radially, axially inner edge thereof with a snap-on bead 61 arranged to cooperate with the clip members in the manner described in conjunction with the bead 53 of the construction shown in Figure 3. The retaining member 60 is further provided with a substantially axially inwardly extending flange 62 which is corrugated to strengthen the same, one of the corrugations 63 presenting a radially inwardly opening groove arranged to receive the curled edge 64 of the central hub cap simulating cover member 59. The remaining annular part of the metallic retaining member 60 is disposed radially outwardly and is corrugated as shown at 65, the radially outer extremity thereof being curled as at 66 to present a radially outwardly facing bead arranged to receive the curled inner edge 67 of the cover member 58. In this construction the parts may likewise be assembled prior to their association with the wheel and may be removed therefrom as a unit by flexing the cover member 58 outwardly from the radially outer edge thereof. Thereafter the point of a pry-off tool may be inserted axially inwardly of the beaded extremity 66 thereof so that outward prying motion will draw the bead 61 axially outwardly over the peaks 48 of the respective spring clips. In this construction also the outer corrugated space 65 of the metallic retaining member may be polished to present a high lustrous external finish, thereby providing an intermediate bead for the multi-part cover assembly.

A further attribute of the construction of Figure 4 is afforded by the cooperative arrangement between the cover member 58 and the retaining member 60. From the drawing it will be seen that these parts are associated with one another through cooperating curvate surfaces on the portions 66 and 67 thereof respectively. Thus when the outer edge of the cover member 58 is flexed locally outwardly it will be seen that the tire cover may flex with pivotal action about the bead 66 through sliding relationship of the cooperating surfaces. In this manner the concentration of bending stresses at the radially inner part of the cover member is avoided and thus fatigue does not set in and premature breakage does not occur.

From the foregoing it will be seen that there is presented herein an improved cover assembly in which the unsprung weight of the entire wheel structure is considerably reduced and yet the multi-part cover assembly is maintained securely in rigidified condition upon the wheel structure. Furthermore, there is presented a structure in which the above advantages are obtained by means of an intermediate ornamental bead which may be quickly and easily applied to and removed from the wheel structure, this application and removal providing for the attachment and removal of the plurality of cover parts, if desired.

Additionally, there is provided herein a construction in which the attachment of the multi-part cover assembly is obtained by virtue of resilient spring clips which are secured to the radially inner portion of the central load bearing part of the wheel structure.

What I claim is:

1. In a wheel structure having a tire rim and a central load bearing portion including an axially inwardly offset bolt-on flange, circumferentially spaced resilient clip members secured to the outer surface of the bolt-on flange and an ornamental retaining member for disposition over the outer side of the wheel structure, said retaining member including a radially inner part arranged for snap-on engagement with said spring clips and an ornamental bead-like portion at the radially outer part thereof, said bead-like portion being defined by circular recesses for receiving auxiliary, concentrically disposed cover members.

2. In a wheel structure heaving a tire rim and a central load bearing portion, circumferentially spaced, resilient clip members secured to the outer surface of the load bearing portion and an ornamental retaining member for disposition over the outer side of the wheel structure, said retaining member including a radially inner part arranged for snap-on engagement with said spring clips and an axially outwardly exposed annular part formed at the radially inner part thereof to retainingly receive a central annular cover member and formed at the radially outer part thereof to retainingly receive a radially outwardly extending annular cover member.

3. In a wheel structure having a tire rim and a central load bearing portion, means at the radially inner part of the central load bearing portion for detachably securing a cover assembly over the outer side of the wheel structure and an ornamental retaining member for disposition over the outer side of the wheel structure, said retaining member including a radially inner part arranged for snap-on engagement with said means at the radially inner part of the wheel structure and an axially outwardly exposed annular part formed at the radially inner part thereof to retainingly receive a central circular cover member and at the radially outer part thereof to retainingly receive a radially outwardly extending annular cover member.

4. In a wheel structure including a multi-flanged rim adapted to carry a tire and a central load bearing portion having cover attaching members on the outer surface thereof, a wheel cover assembly therefor comprising a metallic ring having an annular face portion with shoulders at its inner and outer edges, a plastic trim ring part for the tire rim having an annular edge disposed behind said outer shoulder of the head in retaining engagement therewith and a hub cap part having a peripheral portion snapped over said inner shoulder into detachable engagement with said bead, said metallic ring having a radially inner part arranged for detachable engagement with said attachment means on said load bearing portion of the wheel structure.

5. In a wheel structure including a tire rim and a central load bearing portion having cover attaching means on the outer surface thereof at a radially inner part thereof, a wheel cover assembly therefor comprising a metallic ring having an annular face portion with shoulders at its inner and outer edges, a plastic trim ring part for the tire rim having an annular edge disposed behind said outer shoulder of said bead in retaining engagement therewith and a hub cap part having a peripheral portion snapped over said inner shoulder into detachable engagement with said bead, sail bead being disposed between said trim ring and hub cap part and extending outwardly therebetween so as to be visible and one of said parts being made of a plastic material having the physical property of being self-sustaining insofar as its shape is concerned and also resiliently resistant to deformation, said bead reinforcing said part at its point of attachment to the wheel, said metallic ring also including a radially inwardly extending portion arranged for detachable engagement with said attachment members on the wheel body.

6. In a wheel structure having a tire rim and a central load bearing portion extending radially inwardly therefrom, attachment members on the outer surface of said body portion at a radially inner part thereof for detachably engaging a cover assembly, a metallic annular member having an inner portion arranged for detachable engagement with said attachment member and having an intermediate portion conforming substantially to the configuration of the adjacent portion of the outer surface of the body part when engaged by said attachment members and an outer portion formed to extend axially outwardly from the wheel structure to provide an ornamental bead therefor, said outer portion extending substantially radially inwardly from said intermediate portion and a cover assembly including an outer annular plastic cover member for the tire rim having physical properties enabling it to be form retaining and yet resiliently deflectable, said annular cover member having a radially inner margin arranged for disposition in sandwiched relationship between said intermediate part of the metallic ring and the adjacent portion of the load bearing part of the wheel and a central circular cover member arranged to extend axially inwardly and radially outwardly with respect to the radially inner margin of said outer portion of the metallic ring and into interfitting engagement with said metallic member for retention over the central part of the wheel structure.

7. In a wheel structure having a tire rim and a central load bearing portion, attachment members at a radially inner part thereof for detachably engaging a cover assembly, a metallic annular member having an inner portion arranged for detachable engagement with said attachment members and having an intermediate portion conforming substantially to the configuration of the adjacent portion of the surface of the body part and an outer portion formed to extend axially outwardly from the wheel structure to provide an ornamental bead therefor, said outer portion extending substantially radially inwardly from said intermediate portion and a cover assembly including an outer annular plastic cover member for the tire rim having physical properties enabling it to be form retaining and yet resiliently deflectable, said annular cover member having a radially inner margin arranged for disposition between said intermediate part of the metallic ring and the adjacent portion of the load bearing part of the wheel and a central circular cover member having an outer margin extending beneath the outer portion of the annular member into interlocking engagement therewith, said outer portion of the metallic member being provided with concentric corrugations to rigidify the same.

8. In a wheel structure having a tire rim and a central load bearing portion and attachment means for detachably engaging a cover assembly to retain the same over the wheel structure, said attachment means being disposed at a radially inner part of said load bearing portion, and a cover assembly including a metallic ring having a substantially axially inwardly extending attachment flange for detachable engagement with said attachment members on the wheel structure, said ring being further provided with an intermediate part formed to extend substantially axially outwardly and provided with a circular corrugation and an outer portion formed to extend substantially radially outwardly of said intermediate portion and terminating at its radially outer margin in a circular bead, a central circular hub cap member having an axially inwardly extending, radially outwardly curved edge margin arranged to interfit with the corrugated part of the intermediate flange of the metallic ring and an annular outer cover member formed from a synthetic plastic material having physical properties enabling it to be resiliently deformed and yet form-retaining and self-supporting, said annular cover member having an annular inner edge cross-sectionally configurated to interfit with the bead formed at the radially outer edge of said outer portion of the metallic ring.

9. In a multi-part cover assembly for disposition over the outer side of a wheel structure having resilient cover retaining members extending axially outwardly therefrom, an outer, annular, relatively frangible plastic cover part, and an inner, intermediate, relatively rigid annular member adapted to retainingly receive the adjacent edge of said annular cover part, said annular member including an inner portion shouldered for retaining engagement with said resilient retaining members on the wheel to maintain the cover assembly thereon.

10. In a multi-part cover assembly for disposition over the outer side of a wheel structure having cover retaining members extending axially outwardly therefrom, an outer, annular, relatively frangible plastic cover part, an annular member adapted to retainingly receive the adjacent edge of said cover part and including an intermediate face portion arranged to be axially exposed thereby to afford a border for the cover and also having a radially inner shouldered part arranged to detachably engage said cover retaining members on the wheel to maintain the cover assembly thereon.

11. In a multi-part cover assembly for disposition over the outer side of a wheel structure having resilient cover retaining members extending axially outwardly therefrom, an outer, annular, relatively frangible plastic cover part, a central circular, relatively frangible plastic cover part and an intermediate, relatively rigid, annular member adapted to retainingly receive the adjacent edges of the cover parts to hold them together in concentric relationship, said annular member including an axially inwardly extending shouldered part for retainingly engaging with the retaining members extending from the wheel to maintain the cover assembly thereon.

12. In a multi-part cover assembly for the outer side of a wheel structure having cover retaining means thereon, an outer annular plastic cover part which is form sustaining in its normal plane but is transversely deflectable, a central circular cover part and an intermediate, relatively rigid annular member adapted to retainingly receive the adjacent margins of said cover parts to hold them together in concentric relationship, said circular member including an axially inwardly disposed part for retainingly engaging the retaining means on the wheel to maintain the cover assembly thereon.

13. In a wheel structure including a multi-flanged tire rim and a wheel body connected thereto, a wheel cover comprising concentric ring and hub cap members for disposition over the wheel rim and body respectively, and an intermediate ring for covering the adjacent margins of said members, for holding them together and for detachably retaining them on the wheel, said intermediate ring being channeled on its rear side and having its outer edge turned back upon itself so as to define a seat over which said ring member is adapted to be resiliently pressed from the rear of the ring.

14. In a wheel structure including a multi-flanged tire rim and a wheel body connected thereto, a wheel cover comprising concentric ring and hub cap members for disposition over the wheel rim and body respectively, and an intermediate ring for covering the adjacent margins of said members, for holding them together and for detachably retaining them on the wheel, said intermediate ring having its outer edge turned back upon itself so as to define a seat over which said ring member is adapted to be resiliently pressed from the rear of the ring, said intermediate ring also having an inner turned edge behind which the outer margin of the hub cap is adapted to extend and to be applied from the rear of the cover.

15. As an article of manufacture, a wheel cover for disposition over an outer side of the wheel to conceal the rim and body parts of the wheel radially inward of the tire, said cover comprising concentric circular plastic ring and hub cap sections joined together at their adjacent margins by a common relatively narrow width metal ring having rearwardly projecting cover retaining means, each of said cover sections being applied to a margin of said intermediate ring from the rear of the ring by resiliently pressing the section over and onto a marginal edge of the ring.

16. In a wheel structure including a wheel body, a wheel cover for the wheel body comprising a hub cap of light, resilient, form-retaining but deflectable material and an outer rigidifying ring for the hub cap over which the outer peripheral margin of the hub cap is resiliently applied from the rear side of the ring so that the hub cap is carried by the ring, and means on the ring for detachable retaining cooperation with the wheel body.

17. In a wheel structure including a multi-flanged tire rim and a wheel body connected thereto, a wheel cover comprising an annular trim ring for disposition over the flanges of the tire rim, said trim ring being made of a resilient plastic material which has the physical property of being self-sustaining and yet resistant to permanent deformation, an attaching ring for said trim ring made of a relatively more rigid material than that of the trim ring on which the trim ring is resiliently snapped from the rear side of the more rigid ring, the rigid ring being provided with rearwardly projecting means for detachable snap-on engagement with one of said tire rim and wheel body parts.

18. In a cover structure for a wheel including a multi-flanged tire rim and a wheel body connected thereto, a cover assembly for disposition over an outer side of the wheel and including a circular cover member made of plastic material having the property of being self-sustaining as to form and also having sufficient resiliency to enable it to resist permanent deformation, and a ring of more rigid material than that of the cover member to which the cover member is detachably secured and which ring is provided with means for detachably holding itself and the cover member on the wheel, said cover also having a portion arranged to extend into sandwiched relationship between a portion of the ring and the adjacent portion of a wheel to which it is attached to cushion the ring against rattling on the wheel during use.

GEORGE ALBERT LYON.